United States Patent
Arabia, Jr. et al.

(10) Patent No.: US 9,382,732 B2
(45) Date of Patent: Jul. 5, 2016

(54) DOOR ASSEMBLY WITH ANTI-THEFT DEVICE

(75) Inventors: Frank J. Arabia, Jr., Macomb, MI (US); Robert D. Granny, Rochester Hills, MI (US); Ian S. Buckley, Swartz Creek, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 643 days.

(21) Appl. No.: 13/011,537

(22) Filed: Jan. 21, 2011

(65) Prior Publication Data

US 2012/0187715 A1   Jul. 26, 2012

(51) Int. Cl.
| | |
|---|---|
| *E05C 3/06* | (2006.01) |
| *E05B 77/44* | (2014.01) |
| *E05B 79/02* | (2014.01) |
| *E05B 79/12* | (2014.01) |
| *E05B 85/06* | (2014.01) |
| *E05C 3/16* | (2006.01) |
| *E05C 19/08* | (2006.01) |

(Continued)

(52) U.S. Cl.
CPC ............... *E05B 77/44* (2013.01); *E05B 79/02* (2013.01); *E05B 79/12* (2013.01); *E05B 85/06* (2013.01); *B60J 5/04* (2013.01); *B60R 25/00* (2013.01)

(58) Field of Classification Search
CPC ......... B60J 5/0437; B60J 5/04; E05C 17/203; Y10T 70/489; Y10T 70/8459; Y10T 70/7955; Y10T 292/0822; Y10T 292/79; B60R 25/00; E06B 65/20; E05B 79/02; E05B 79/12; E05B 85/06

USPC .................. 292/216, 300, 281, 346, DIG. 11, 292/DIG. 53, DIG. 54, 361; 296/146.6, 296/146.7; 49/503; 70/51, 52, 179, 431, 70/443, 448

See application file for complete search history.

(56) References Cited

U.S. PATENT DOCUMENTS

| | | | | | |
|---|---|---|---|---|---|
| 571,027 | A | * | 11/1896 | Taylor | E05B 55/005 70/448 |
| 612,397 | A | * | 10/1898 | Burgess | E05B 55/005 70/448 |

(Continued)

FOREIGN PATENT DOCUMENTS

| | | |
|---|---|---|
| CN | 201068665 Y | 6/2008 |
| CN | 101555737 A | 10/2009 |

(Continued)

OTHER PUBLICATIONS

Office Action of the State Intellectual Property Office of the People's Republic of China for corresponding Chinese Patent Application No. 201210018848.8 dated Jan. 15, 2014.

*Primary Examiner* — Kristina Fulton
*Assistant Examiner* — Faria Ahmad
(74) *Attorney, Agent, or Firm* — Quinn Law Group, PLLC

(57) ABSTRACT

A door assembly having an anti-theft device is provided. The assembly includes a door component defining an internally protruding cavity. A locating tab extends from the anti-theft device and is insertable in the cavity in the door component, thereby locating the anti-theft device relative to the door component. The door component includes a locking tab attached or integrally formed on the door component and adapted to snap into an opening in the anti-theft device, thereby securing the anti-theft device relative to the door component. The anti-theft device may be a shield and the door component may be a latch mechanism.

16 Claims, 3 Drawing Sheets

(51) Int. Cl.
 *B60J 5/00* (2006.01)
 *B60J 5/04* (2006.01)
 *B60R 25/00* (2013.01)

(56) References Cited

U.S. PATENT DOCUMENTS

| | | | | |
|---|---|---|---|---|
| 723,551 | A * | 3/1903 | Roche | E05B 55/005 70/448 |
| 1,157,041 | A * | 10/1915 | Reynolds | F24C 15/02 126/190 |
| 2,011,515 | A * | 8/1935 | Fraim | E05B 67/24 70/38 C |
| 2,454,145 | A * | 11/1948 | Erkkila | E05B 9/00 70/448 |
| 3,000,659 | A * | 9/1961 | Schlage | E05C 1/163 292/336.3 |
| 3,674,246 | A * | 7/1972 | Freeman | B01D 3/326 261/114.1 |
| 4,113,294 | A * | 9/1978 | Bierman | E05B 83/36 292/346 |
| 4,398,984 | A * | 8/1983 | Uchiyama | B60J 5/042 156/196 |
| 4,486,040 | A * | 12/1984 | Strangward | E05B 65/0057 292/160 |
| 4,570,467 | A * | 2/1986 | Greco | E05B 65/0894 292/346 |
| 4,575,138 | A * | 3/1986 | Nakamura et al. | 292/216 |
| 4,628,300 | A * | 12/1986 | Amato | E05B 17/2003 180/287 |
| 4,688,409 | A * | 8/1987 | Oliver | E05B 15/1614 70/417 |
| 4,723,428 | A * | 2/1988 | Yamaguchi | E05B 17/185 70/423 |
| 4,735,447 | A * | 4/1988 | Kleefeldt | E05B 81/06 292/201 |
| 4,756,565 | A * | 7/1988 | Myslicki | E05B 15/0245 292/340 |
| 4,803,856 | A * | 2/1989 | Ling | E05B 37/14 70/28 |
| 4,845,894 | A * | 7/1989 | Herringshaw | B60J 5/0416 296/146.2 |
| 4,852,919 | A * | 8/1989 | Nimee | E05C 17/56 16/82 |
| 4,882,842 | A * | 11/1989 | Basson et al. | 29/857 |
| 4,892,342 | A * | 1/1990 | Newman | E05B 79/06 292/336.3 |
| 4,930,822 | A * | 6/1990 | Shen | E05B 55/005 292/357 |
| 4,934,748 | A * | 6/1990 | Hayakawa | E05B 17/20 292/336.3 |
| 4,946,208 | A * | 8/1990 | Myslicki | E05B 15/0245 292/216 |
| 5,031,946 | A * | 7/1991 | Yarrow | 292/337 |
| 5,044,181 | A * | 9/1991 | Roop | E05B 63/122 70/131 |
| 5,077,996 | A * | 1/1992 | Lien | E05B 17/145 292/346 |
| 5,183,302 | A * | 2/1993 | Pelachyk | E05B 85/12 292/336.3 |
| 5,202,172 | A * | 4/1993 | Graf | F16B 5/123 24/292 |
| 5,238,276 | A * | 8/1993 | Burns | E05B 79/06 292/337 |
| 5,315,850 | A * | 5/1994 | Edeus | E05B 17/2053 292/153 |
| 5,341,544 | A * | 8/1994 | Richter | B60R 13/0206 24/289 |
| 5,419,606 | A * | 5/1995 | Hull | B60R 13/0206 24/297 |
| 5,456,507 | A * | 10/1995 | Jones | E05B 15/0205 292/340 |
| 5,473,922 | A * | 12/1995 | Bair | E05B 47/0012 292/144 |
| 5,479,802 | A * | 1/1996 | Miller | E05B 9/00 29/464 |
| 5,480,117 | A * | 1/1996 | Fleming, III | E04B 1/6183 248/231.9 |
| 5,586,796 | A * | 12/1996 | Fraser | E05B 15/0205 292/340 |
| 5,636,540 | A * | 6/1997 | Myers | E05B 9/084 24/458 |
| 5,676,002 | A * | 10/1997 | Hoeptner, III | E05B 83/36 292/346 |
| 5,722,276 | A * | 3/1998 | Aigner | E05B 9/002 292/337 |
| 5,787,741 | A * | 8/1998 | Shen | E05B 15/02 292/21 |
| 5,829,799 | A * | 11/1998 | Yamagishi | E05B 81/14 292/201 |
| 5,855,400 | A | 1/1999 | Ohhashi et al. | |
| 6,014,876 | A * | 1/2000 | Taylor | B60R 25/04 292/346 |
| 6,240,754 | B1 * | 6/2001 | Petersen | E05B 83/36 292/346 |
| 6,318,783 | B1 * | 11/2001 | Knox | B29C 65/58 29/91 |
| 6,322,114 | B1 * | 11/2001 | Kurachi et al. | 292/341.17 |
| 6,412,852 | B1 * | 7/2002 | Koa | B60R 13/0206 296/146.5 |
| 6,530,251 | B1 * | 3/2003 | Dimig | E05B 79/06 292/336.3 |
| 6,546,767 | B1 * | 4/2003 | Kirejczyk | E05B 83/36 292/346 |
| 6,676,324 | B1 * | 1/2004 | Pleiss | B60R 13/0206 24/581.11 |
| 6,722,170 | B2 * | 4/2004 | Squier | E05B 9/08 292/DIG. 53 |
| 6,725,606 | B2 * | 4/2004 | Nishikawa | B60J 5/0416 49/502 |
| 6,863,327 | B2 * | 3/2005 | Granger et al. | 296/1.08 |
| 6,929,309 | B1 * | 8/2005 | Radu | B60R 13/0243 296/146.7 |
| 6,932,416 | B2 * | 8/2005 | Clauson | B60R 13/0206 296/146.7 |
| 6,983,978 | B2 * | 1/2006 | Radu | B60R 13/0243 296/146.5 |
| 7,008,003 | B1 * | 3/2006 | Hirose | B60R 13/0206 296/146.7 |
| 7,024,896 | B2 * | 4/2006 | Squier | E05B 9/08 292/DIG. 53 |
| 7,104,575 | B2 * | 9/2006 | Kakita | E05B 85/12 292/348 |
| 7,111,877 | B2 * | 9/2006 | Larsen | E05B 81/14 292/201 |
| 7,131,685 | B2 * | 11/2006 | Carrier | B29C 45/1676 296/146.7 |
| 7,198,319 | B2 * | 4/2007 | Schroder | B60J 5/0416 296/146.7 |
| 7,347,026 | B1 * | 3/2008 | Garcia Martin | B60J 5/0416 296/146.7 |
| 7,393,023 | B1 * | 7/2008 | Kelly | A01K 1/0017 292/144 |
| 7,841,221 | B2 * | 11/2010 | Hill | E05C 9/042 70/120 |
| 8,007,016 | B2 * | 8/2011 | Mantyla | B01D 17/0208 220/4.03 |
| 8,020,904 | B2 * | 9/2011 | Flory | E05B 63/14 292/241 |
| 8,162,360 | B2 * | 4/2012 | Takaya | E05B 79/04 292/336.3 |
| 8,303,004 | B2 * | 11/2012 | Lee | E05B 77/06 292/216 |
| 8,407,942 | B1 * | 4/2013 | Jones | E05B 17/2084 292/346 |
| 8,424,926 | B2 * | 4/2013 | Ueno | H04M 1/0249 292/58 |
| 8,424,927 | B2 * | 4/2013 | Tsai | F16B 5/0664 292/137 |
| 8,567,839 | B2 * | 10/2013 | Kalus | B60N 2/466 296/39.1 |
| 9,061,403 | B2 * | 6/2015 | Colombo | B25B 27/00 |
| 9,067,625 | B2 * | 6/2015 | Morris | B62D 27/023 |
| 2001/0005080 | A1 * | 6/2001 | Inoue | 292/216 |

(56) References Cited

U.S. PATENT DOCUMENTS

| | | | |
|---|---|---|---|
| 2002/0027376 A1* | 3/2002 | Marcovecchio | B60R 13/0243 296/146.7 |
| 2004/0094989 A1* | 5/2004 | Matsumoto | B60J 10/0065 296/146.1 |
| 2005/0140148 A1* | 6/2005 | Stoof | E05B 17/04 292/216 |
| 2005/0253416 A1* | 11/2005 | Radu | B60R 13/0243 296/146.7 |
| 2006/0017306 A1* | 1/2006 | Smith | B60J 5/0418 296/146.7 |
| 2006/0119114 A1* | 6/2006 | Kreitz | E05B 83/36 292/346 |
| 2006/0208503 A1* | 9/2006 | Simchayoff | E05B 15/022 292/216 |
| 2007/0023431 A1* | 2/2007 | Rouns | B65F 1/1615 220/210 |
| 2007/0075552 A1* | 4/2007 | Hayakawa | E05B 81/06 292/216 |
| 2007/0126245 A1* | 6/2007 | Feng | A61G 3/0808 292/216 |
| 2007/0176434 A1* | 8/2007 | Joschko | E05B 81/06 292/216 |
| 2007/0273160 A1* | 11/2007 | Fujimatsu | E05B 81/25 292/216 |
| 2008/0012355 A1* | 1/2008 | Fujimatsu | E05B 83/36 292/216 |
| 2008/0048458 A1* | 2/2008 | Suzumura | E05B 79/08 292/216 |
| 2008/0060395 A1* | 3/2008 | Hanisch | E05B 85/02 70/237 |
| 2008/0122229 A1* | 5/2008 | Choi | B60R 7/04 292/216 |
| 2008/0185850 A1* | 8/2008 | Takaya | E05B 79/04 292/336.3 |
| 2008/0272607 A1* | 11/2008 | Kannapell | B64C 25/26 292/216 |
| 2009/0021027 A1* | 1/2009 | Inan | E05B 85/26 292/341.12 |
| 2009/0134638 A1* | 5/2009 | Kutschat | E05B 85/247 292/216 |
| 2009/0289464 A1* | 11/2009 | Pawson | E05B 15/02 292/346 |
| 2010/0024193 A1* | 2/2010 | Hanisch | 29/428 |
| 2010/0199726 A1* | 8/2010 | Varney | E05B 17/2038 70/90 |
| 2010/0269431 A1* | 10/2010 | Young | E06B 5/11 52/204.1 |
| 2011/0316291 A1* | 12/2011 | Loughlin | E05B 13/001 292/101 |
| 2013/0036779 A1* | 2/2013 | Akizuki | E05B 77/265 70/237 |
| 2013/0140846 A1* | 6/2013 | Montoya | B60R 13/0243 296/146.7 |
| 2013/0181475 A1* | 7/2013 | Torii | B60J 5/0413 296/146.7 |
| 2014/0035322 A1* | 2/2014 | Sakhara | B62D 25/02 296/187.12 |
| 2014/0265430 A1* | 9/2014 | Choi | B60J 5/047 296/146.7 |
| 2015/0143859 A1* | 5/2015 | Beck, Jr. | F16B 41/005 70/431 |

FOREIGN PATENT DOCUMENTS

| | | |
|---|---|---|
| DE | 19511294 A1 | 10/1996 |
| DE | 29909260 U1 | 8/1999 |

* cited by examiner

DOOR ASSEMBLY WITH ANTI-THEFT DEVICE

TECHNICAL FIELD

The invention relates to a door assembly having an anti-theft device and a method of assembling a door.

BACKGROUND OF THE INVENTION

A typical vehicle has at least one access door. Such a door typically has a latch mechanism actuated by an outside door handle to gain access to the interior of the vehicle. Vehicles are sometimes subject to unauthorized entry and theft. To prevent such unauthorized entry while permitting authorized access, on at least some of the vehicle doors the latch mechanism is provided with an externally actuated lock having a key cylinder rod. Attempts to gain unauthorized entry into the vehicle include triggering the door latch mechanism by forcibly manipulating the key cylinder rod in the door. An anti-theft device such as a shield may be placed in the door assembly to prevent unauthorized access or tampering of the key cylinder rod. The shield is typically attached within the door assembly via a fastener such as a threaded stud, thereby taking up packaging space and shifting the glass run channel by about 10 mm.

SUMMARY OF THE INVENTION

A door assembly having an anti-theft device is provided. A locating tab extends from the anti-theft device and is insertable in the cavity in the door component, thereby locating the anti-theft device relative to the door component. The door component includes a locking tab attached or integrally formed on the door component and adapted to snap into an opening in the anti-theft device, thereby securing the anti-theft device relative to the door component. The anti-theft device may be a shield and the door component may be a latch mechanism. Assembly of the shield is simplified with the elimination of the fastener typically used to secure anti-theft devices within the door assembly. Because the locating tab locates the shield relative to the door component, the operation of driving a small fastener to locate and secure the assembly is not required. Further, door packaging is improved by reducing space that is otherwise taken up by a typical fastener. A method of assembling a door is also provided.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
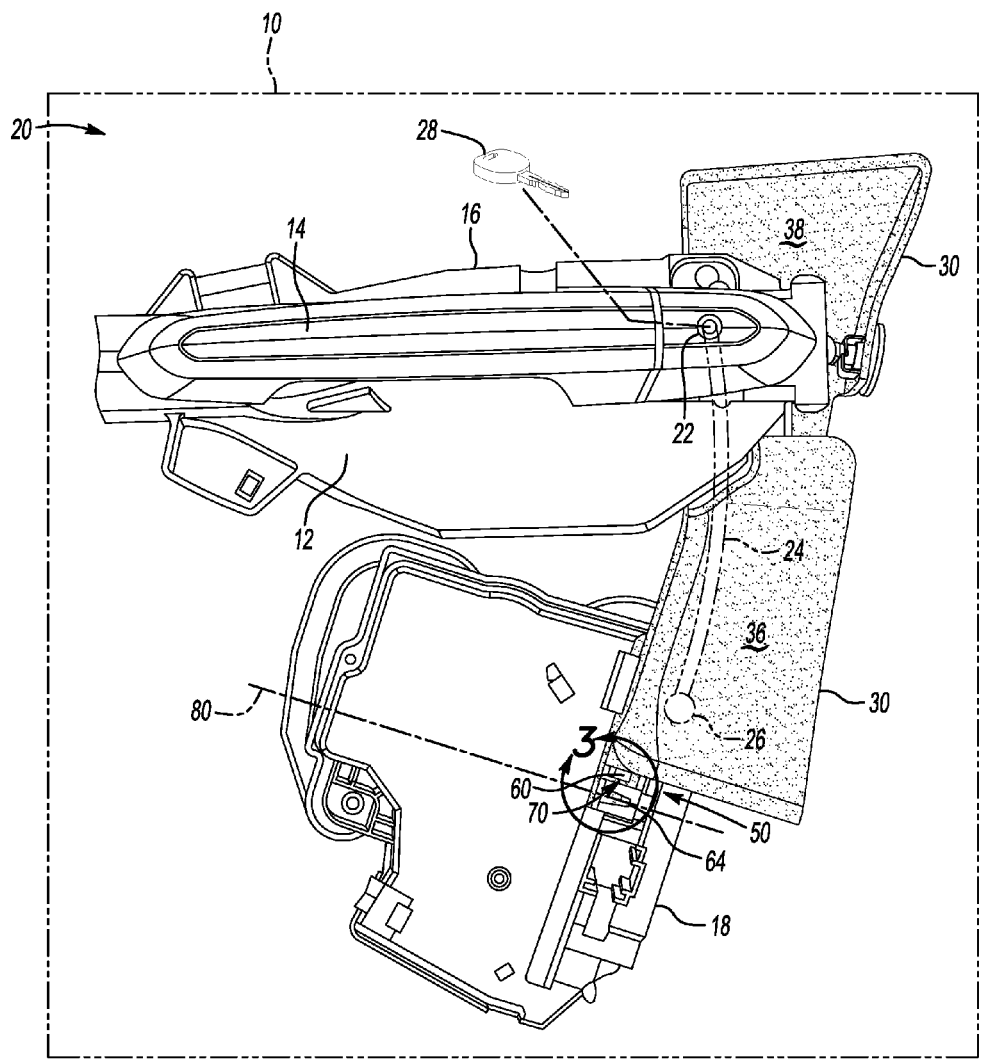
FIG. 1 is a schematic perspective fragmentary view of a portion of a vehicle door in accordance with the present disclosure.

Referring to the drawings, wherein like reference numbers refer to like components, FIG. 1 shows a portion of a vehicle door 10. The door 10 includes an exterior-facing member 12 and an exterior door-release handle 14, which are part of a handle assembly 16. The door 10 includes a latch mechanism 18, shown in FIG. 1. As understood by one of ordinary skill in the art, the latch mechanism 18 is capable of being fastened and released by door-release handle 14 as well as via an interior door-release handle (not shown) to permit the door 10 to selectively open and close the entryway 20. The latch mechanism 18 may be a unitary or one-piece configuration or may include a plurality of components. The door 10 also includes an inner structure (not shown) for supporting the exterior-facing member 12, the latch mechanism 18, and various wiring, reinforcement members and other door hardware, as known by those skilled in the art.

Referring to FIG. 1, a key-cylinder 22 is located on the door 10, such that the key-cylinder is accessible from the exterior-facing member 12. Key-cylinder 22 is operatively connected to latch mechanism 18 via a rod 24 (shown in phantom) at position 26 for selectively locking and unlocking latch mechanism 18. Key-cylinder 22 may be operatively connected to a pawl (not shown) that rotates when a key 28 is turned in the key-cylinder 22, thereby translating the rod 24 and selectively locking and unlocking latch mechanism 18. Alternatively, a remote keyless system may be used to lock and unlock the latch mechanism 18.

Figure 2:
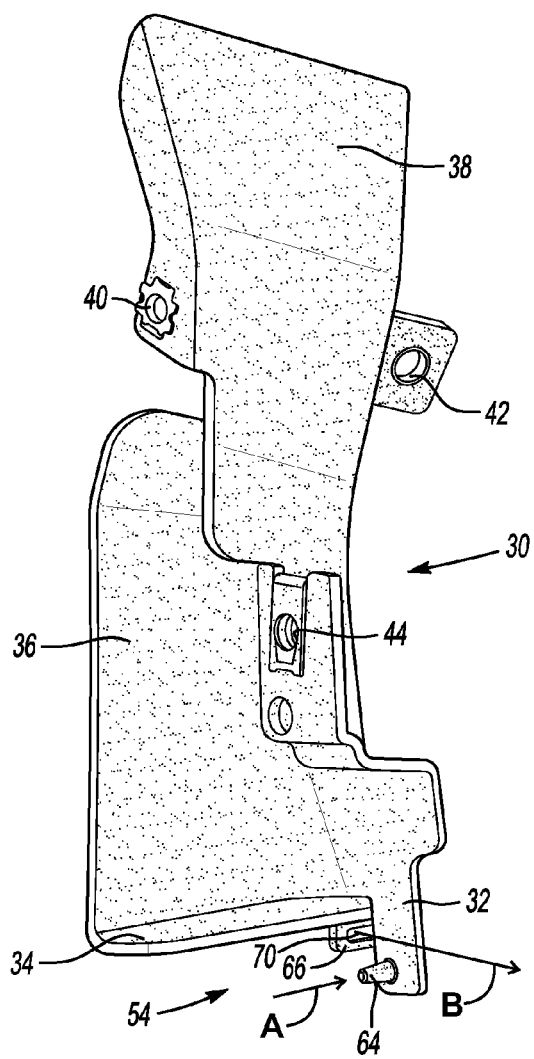
FIG. 2 is a schematic perspective fragmentary view of a shield shown in FIG. 1, showing the opposite side of the shield shown in FIG. 1.

To prevent manipulation or jimmying of the key-cylinder 22 and rod 24 by a thief using an implement such as a screwdriver, an anti-theft device such as shield 30 is operatively connected to the exterior-facing member 12, as shown in FIG. 1. The shield 30 is positioned between the rod 24 and exterior-facing member 12. FIG. 2 is a schematic perspective view of the shield 30. For clarity, the shield 30 is shown shaded in FIGS. 1-3. Shield 30 includes first, second, third and fourth walls 32, 34, 36, 38 (shown in FIG. 2) configured to block physical access to the rod 24 from the exterior-facing member 12, shown in FIG. 1. Shield 30 includes a first aperture 40 for attachment to a door inner panel (not shown), a second aperture 42 for attachment to the handle assembly 16 and a third aperture 44 for attachment to the door inner panel (not shown). Suitable fasteners such as bolts or studs may be used to attach the apertures 40, 42, 44 to the respective components.

Figure 3:
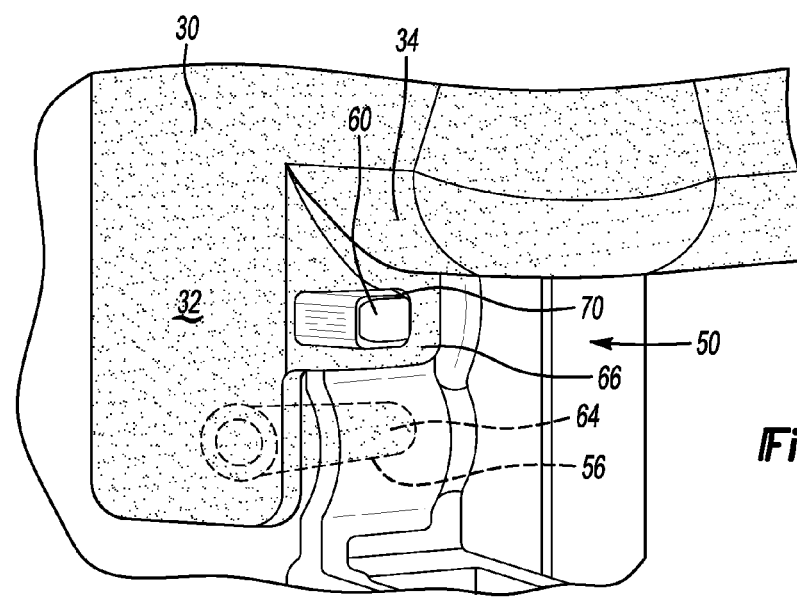
FIG. 3 is a close-up schematic perspective fragmentary view of a portion of the latch mechanism and shield shown in the door of FIG. 1.

The shield 30 is attached to a door component, such as latch mechanism 18, through a locating and attachment mechanism 50, shown in FIGS. 1 and 3. Alternatively, the shield 30 may be attached to another door component, such as a bracket or panel (not shown), specially formed to have the features of the locating and attachment mechanism 50, shown in FIG. 3 and described below. FIG. 3 is a close-up schematic perspective fragmentary view of the portion 3 shown in FIG. 1. The locating and attachment mechanism 50 includes a door portion 52 (shown in FIG. 4) and a shield portion 54 (shown in FIG. 2).

Figure 4:
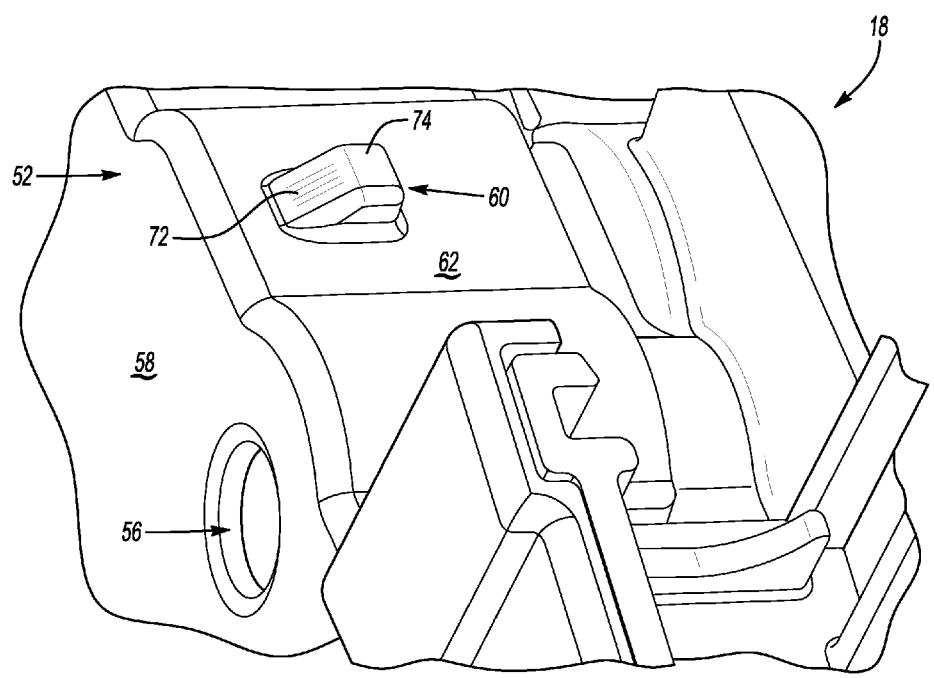
FIG. 4 is a close-up schematic perspective fragmentary view of a portion of the latch mechanism shown in FIG. 1.

The door portion 52 of the locating and attachment mechanism 50 is shown in FIG. 3. The door portion 52 includes an internally protruding cavity 56 (also shown in phantom in FIG. 3) formed on a first face 58 of the latch mechanism 18. The door portion 52 includes a locking tab 60 that is attached onto or integrally formed on a second face 62 of the latch mechanism 18. As shown in FIG. 4, the first face 58 is angled with respect to the second face 62. The first face 58 may be oriented approximately perpendicularly with respect to the second face 62. Thus, referring to FIG. 2, application of a first force A (parallel to the axis 80 shown in FIG. 1) and a second force B, which are approximately perpendicular to each other, is needed to release the shield from the door component. The latch mechanism 18 may be composed of plastic, metal or other suitably rigid material. The latch mechanism 18 may be formed with the internally protruding cavity 56 and locking tab 60 using injection molding techniques. The latch mechanism 18 may also be hydroformed, stamped, cast, extruded or otherwise manufactured. The latch mechanism 18 may have a unitary or one-piece configuration or may be an assembly of components.

The shield portion 54 of the locating and attachment mechanism 50 is shown in FIG. 2. The shield portion 54 includes a locating tab 64 that is attached onto or integrally formed on the first wall 32 of the shield 30. The shield portion 54 includes a flange 66 having an opening 70 (shown in FIGS. 1-3). The flange 66 abuts and extends away from the first wall 32 and the second wall 34 of the shield 30, as shown in FIG. 2. The first wall 32 is angled with respect to the second wall 34. The first wall 32 may be oriented approximately perpendicularly with respect to the second wall 34. The locking tab 60 of FIG. 4 is adapted to fit or snap into the opening 70 in the shield 30, thereby securing the shield 30 relative to the latch mechanism 18. The locating tab 64 is insertable in the cavity 56 in the latch mechanism 18, thereby locating the shield 30 relative to the latch mechanism 18. The cavity 56 may be designed to have a shape that is substantially complementary to the locating tab 64. Optionally, the locating tab 64 may be tapered along its length, as shown in FIG. 2. The shield 30 may be composed of plastic, metal or other suitably rigid material to provide resistance to tampering of the door structure. The shield 30 may be formed having the locating tab 64 and opening 70 using injection molding techniques. The shield 30 may also be hydroformed, stamped, cast, fabricated, extruded or otherwise manufactured.

The locating and attachment mechanism 50 functions as follows: the locating tab 64 is partially inserted into the cavity 56 in the latch mechanism 18 before the locking tab 60 makes contact with the opening 70 in the shield 30. Referring to FIG. 3, the locating tab 64 protrudes into the cavity 56 in the latch mechanism 18 to locate the proper position of the shield 30 relative to the latch mechanism 18 as well as to retain the shield 30 in the latch mechanism 18. The opening 70 in the shield 30 is then positioned above the locking tab 60, causing the locking tab 60 to snap into place in the opening 70. The shield 30 is then fully assembled in the door 10, as shown in FIGS. 1 and 3.

Referring to FIG. 4, the locking tab 60 in the latch mechanism 18 has a first portion 72 that is tapered to allow for easy insertion in the opening 70 (shown in FIG. 3) in the shield 30 during assembly. The locking tab 60 has a second portion 74 that is raised above the second face 62 of the latch mechanism 18, as shown in FIG. 4. The second portion 74 allows the locking tab 60 to be secured in the opening 70 after assembly and prevents the locking tab 60 from being detached from the opening 70. The shield 30 may be removed from the latch mechanism 18 by applying a force to remove or un-snap the locking tab 60 from the opening 70. This would allow the locating tab 64 to be removed from the cavity 56 in the latch mechanism 18.

The locating and attachment mechanism 50 simplifies assembly of the shield 30 into the door 10 by eliminating the fastener (not shown) typically used to secure an anti-theft devices in a vehicle. Because the locating tab 64 locates the shield 30 to the latch mechanism 18, the blind operation of driving a small fastener to locate and secure the assembly is not required. A typical fastener would shift the rear glass run channel (not shown) by approximately 10 mm. Door packaging is improved as space is not required for the typical fastener (along the axis 80).

While the best modes for carrying out the invention have been described in detail, those familiar with the art to which this invention relates will recognize various alternative designs and embodiments for practicing the invention within the scope of the appended claims.

The invention claimed is:

1. A door assembly comprising:
   a door component having a first face, a second face and an internally protruding cavity, the door component including a locking tab attached or integrally formed on the second face of the door component;
   a shield having an opening and a locating tab extending from the shield;
   wherein the first face of the door component defines the internally protruding cavity;
   wherein the first face is oriented approximately perpendicularly with respect to the second face, the first face being directly adjacent to the second face;
   wherein the entire locating tab is insertable in the cavity in the door component, thereby locating the shield relative to the door component;
   wherein the locking tab is directly attached to the second face of the door component and
   wherein the locking tab is adapted to extend through the opening in the shield, the locking tab being configured to secure the shield relative to the door component.

2. The assembly of claim 1, wherein the door component is a latch mechanism.

3. The assembly of claim 1, wherein the locking tab has a first portion that is tapered to allow the entire locking tab to be inserted through one end of the opening and extend through the opposite end of the opening in the shield.

4. The assembly of claim 1, wherein the locking tab has a second portion that is raised relative to the second face of the door component to secure the locking tab in the opening in the shield, the second portion being configured to extend in a direction substantially perpendicular to the cavity of the door component.

5. The assembly of claim 1, wherein the shield is positioned between an exterior-facing member and a rod operatively connected to a key cylinder for unlocking the door assembly; and
   wherein the shield includes at least one wall configured to block access to the rod from the exterior-facing member.

6. The assembly of claim 1, wherein the shield is formed from a plastic material.

7. The assembly of claim 1, wherein:
   the shield includes first and second walls, the first wall being angled with respect to the second wall;
   the locating tab extends from the first wall; and
   the opening in the shield is formed on a flange abutting the first wall and the second wall.

8. The assembly of claim 7, wherein the first wall is oriented approximately perpendicularly with respect to the second wall.

9. A vehicle comprising:
   an entryway;
   a door assembly for the entryway, the door assembly having:
      an exterior-facing member;
      a latch mechanism operatively connected to the exterior-facing member,
      the latch mechanism having a first and a second face;

wherein the first face is oriented approximately perpendicularly with respect to the second face, the first face being directly adjacent to the second face;

an internally protruding cavity defined by the first face of the latch mechanism;

a shield defining an opening and operatively connected to the latch mechanism;

a locating tab extending from the first wall of the shield such that the entire locating tab is insertable in the cavity in the latch mechanism, thereby locating the shield relative to the latch mechanism;

a locking tab integrally formed on the second face of the latch mechanism and adapted to extend through the opening in the shield, the locking tab being configured to secure the shield relative to the latch mechanism;

wherein the locking tab is directly attached to the second face of the door component and wherein the locking tab defines a second portion that is raised to secure the locking tab in the opening in the shield, the second portion being configured to extend in a direction substantially perpendicular to the cavity of the latch mechanism.

10. The vehicle of claim 9:

wherein the shield is positioned between the exterior-facing member and a rod operatively connected to a key cylinder for unlocking the door; and the shield includes at least one wall configured to block access to the rod from the exterior-facing member.

11. The vehicle of claim 9, wherein the opening in the shield is formed on a flange abutting a first wall and a second wall of the shield, the first wall being oriented approximately perpendicularly with respect to the second wall.

12. The vehicle of claim 9, wherein:

the locking tab defines a first portion that is tapered to allow the entire locking tab to be inserted through one end of the opening and extend through the opposite end of the opening in the shield.

13. A method of assembling a door, the method comprising:

forming a door component with an internally protruding cavity, wherein the cavity is a blind hole;

wherein the door component includes a first face and a second face, the internally protruding cavity being defined by the first face;

wherein the first face is oriented approximately perpendicularly with respect to the second face, the first face being directly adjacent to the second face;

forming a shield having a extending locating tab and forming an opening in the shield on a flange abutting a first wall and a second wall of the shield;

inserting the entire locating tab of the shield into the cavity in the door component, thereby locating the shield to the door component;

directly attaching or integrally forming a locking tab on the second face of the door component; and fitting the locking tab into the opening in the shield such that the locking tab extends through the opening, the locking tab being configured to secure the shield relative to the door component.

14. The method of claim 13, further comprising:

forming a first portion on the locking tab that is tapered to allow the entire locking tab to be inserted through one end of the opening and extend through the opposite end of the opening in the shield;

forming a second portion on the locking tab that is raised to secure the locking tab in the opening in the shield, the second portion being configured to extend in a direction substantially perpendicular to the cavity of the door component.

15. The assembly of claim 1, wherein the cavity of the door component is a blind hole.

16. The vehicle of claim 9, wherein the cavity defined by the latch mechanism is a blind hole.

* * * * *